United States Patent [19]

Nakamura et al.

[11] Patent Number: 4,952,787
[45] Date of Patent: Aug. 28, 1990

[54] METHOD AND APPARATUS FOR DETECTING FOCUS ERROR USING PITS AND LIGHT BEAMS HAVING ASTIGMATISM

[75] Inventors: Shigeru Nakamura, Tachikawa; Takeshi Maeda, Kokubunji, both of Japan

[73] Assignee: Hitachi, Ltd., Tokyo, Japan

[21] Appl. No.: 277,988

[22] Filed: Nov. 30, 1988

[30] Foreign Application Priority Data

Dec. 2, 1987 [JP] Japan ............................... 62-303127
Apr. 28, 1988 [JP] Japan ............................... 63-103904

[51] Int. Cl.$^5$ .......................... G01J 1/20; G11B 7/00
[52] U.S. Cl. ............................... 250/201.5; 369/275.1; 369/44.11
[58] Field of Search ........................... 250/201, 201.5; 369/44-46, 275, 277

[56] References Cited

U.S. PATENT DOCUMENTS

| | | | |
|---|---|---|---|
| 4,025,784 | 5/1977 | Lehureau et al. | 250/201 |
| 4,293,944 | 10/1981 | Izumita et al. | 369/45 |
| 4,467,462 | 8/1984 | Shibata | 369/45 |
| 4,494,226 | 1/1985 | Hazel et al. | 369/45 |
| 4,561,082 | 12/1985 | Gérard et al. | 369/45 |
| 4,562,564 | 12/1985 | Bricot et al. | 369/45 |
| 4,614,863 | 9/1986 | Sato | 250/201 |
| 4,674,070 | 6/1987 | Tajima et al. | 369/275 |
| 4,685,096 | 8/1987 | Romeas | 369/275 |
| 4,731,527 | 3/1988 | Nomura et al. | 369/45 |
| 4,742,218 | 5/1988 | Nakamura et al. | 250/201 |
| 4,748,609 | 5/1988 | Yonezawa et al. | 369/275 |

Primary Examiner—David C. Nelms
Assistant Examiner—Michael Messinger
Attorney, Agent, or Firm—Antonelli, Terry, Stout & Kraus

[57] ABSTRACT

A light beam which is to be focused onto a recording medium is provided with astigmatism. By focusing the light beam having tghe astigmatism with a focusing lens, two orthogonal focal lines having a circle of least confusion at almost a center position therebetween are formed at remote positions. On the recording medium surface are previously formed two kinds of pits which provide identical modulation to the light beam when the recording medium surface is located at the circle of least confusion position and provide different modulations to the light beam when the recording medium surface is deviated from the circle of least confusion position. The light reflected by the recording medium surface and passed through the focusing lens is detected by at least one photo-detector which is disposed in the reflected light beam flux so as to detect the light amount. The signal modulated by at least one of the two kinds of pits is extracted from the output of the photo-detector to extract from the phase or level of the extracted signal a focus error detection signal which is set to a zero or in-focus point when the recording medium surface is located at the circle of least confusion position between the two focal lines.

22 Claims, 17 Drawing Sheets

FIG. 8
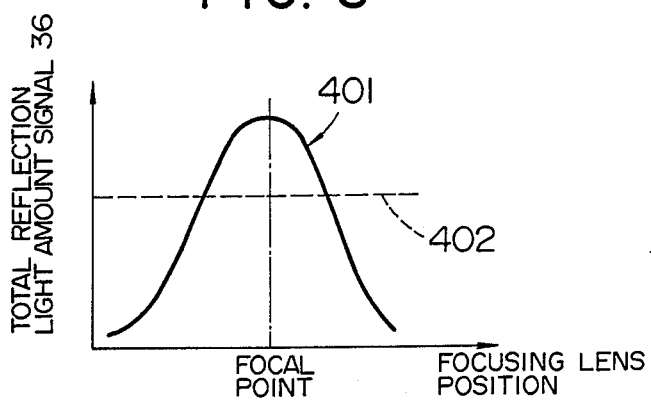
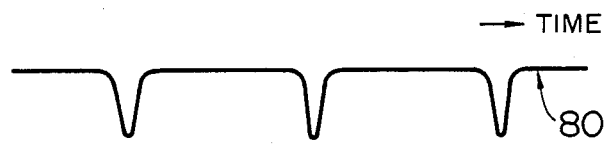
FIG. 9a
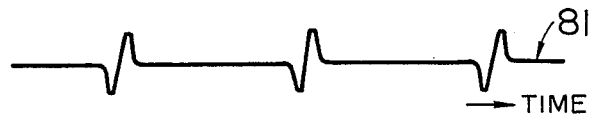
FIG. 9b
FIG. 9c

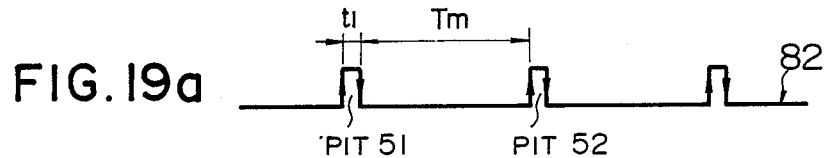
FIG. 19a
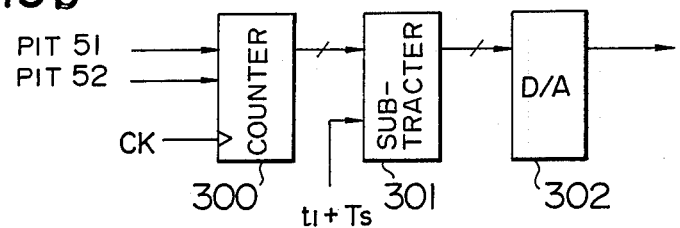
FIG. 19b
FIG. 20
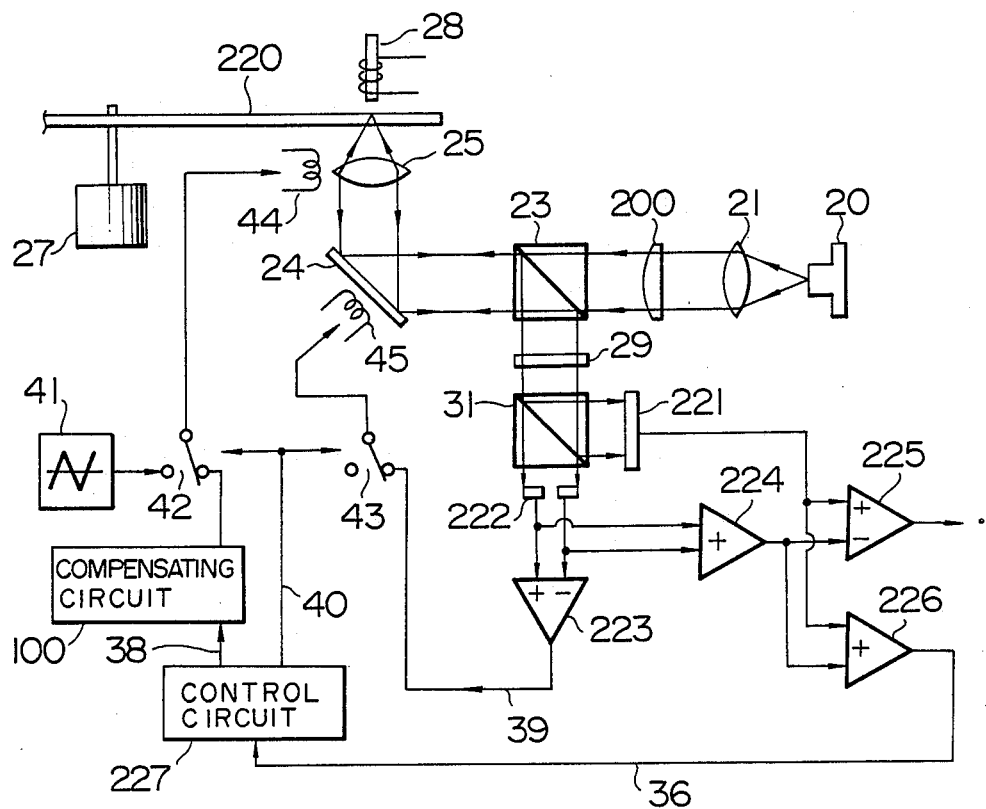

METHOD AND APPARATUS FOR DETECTING FOCUS ERROR USING PITS AND LIGHT BEAMS HAVING ASTIGMATISM

BACKGROUND OF THE INVENTION

The present invention relates to a method and apparatus for detecting a focus error which are used when information is recorded and/or reproduced by irradiating a light beam onto an optical recording medium and, more particularly, to a focus error detection method and apparatus in which a light beam having an astigmatism is focused onto the medium surface and a focus error signal is detected by using the reflected light. The invention also relates to an optical information processing apparatus to record and/or reproduce information onto/from an optical recording medium such as an optical disk by using such a focus error detecting apparatus.

Most of focus error detection systems which are used in conventional optical disk devices or the like use a principle such that a shape of a reflected light beam from the disk changes due to a focus error. The reflected light beam is detected by a multi-divided photo-detector and an unbalance of outputs of detector elements of the multi-divided photo-detector which is caused due to a change in shape of the reflected light beam on the multi divided photo-detector due to the focus error is used as a focus error detection signal.

As such a kind of focus error detection system, for instance, there has been known an astigmatism system disclosed in, e.g., U.S. Pat. No. 4,293,944. That is, when an astigmatism is given from an astigmatism device such as a cylindrical lens or the like to the reflected light beam from a disk, two astigmatic foci or caustic surfaces which are perpendicular to each other are formed at separated positions and the light beam becomes a circle at the position of the circle of least confusion almost at the center between the astigmatic foci. Therefore, a four-divided photo-detector is arranged at the circle of least confusion position to detect the reflected light from the disk, outputs of the photo-detector elements of the four-divided photo-detector are added for respective two pairs of photo-detector elements arranged at diagonal positions, and the difference between two addition signals is calculated, so that a focus error detection signal is derived.

When setting an objective point for focusing, the point at which the data signal or the like becomes maximum or the point at which the reflected light amount which is returned to a light source becomes maximum is detected by another measuring system different from the focusing system, thereby setting the zero point (objective point for focusing) of the focus error detection signal.

In the above astigmatism system, for instance, there is a case such that when a light spot passes through a data pit or the like on the disk surface, to the focus error detection signal is nonlinear with respect to focus deviations so that the auto focusing control system oscillates. This is because when the light spot passes through a data pit or the like, a space distribution of light intensities of the light beam reflected from the disk changes, so that an unbalance is caused among the outputs of the photo-detector elements of the multi-divided photo-detector.

On the other hand, there is a problem such that when the attaching positions of the optical parts are deviated due to a temperature change or the like, the position of the light beam on the multi-divided photo-detector surface is deviated, so that an unbalance occurs among the outputs of the photo-detector elements of the multi-divided photo-detector and the zero point position of a focus error detection signal is deviated from a focusing objective point.

SUMMARY OF THE INVENTION

It is an object of the present invention to provide a focus error detection method and apparatus which are not influenced by data pits or the like on a recording medium surface and in which no offset is caused in the focus error detection signal even if the attaching positions of the optical parts change.

Another object of the invention is to provide a focus error detection method and apparatus which can autonomously adjust the focusing objective point without being influenced by changes in attaching positions of the optical parts.

Still another object of the invention is to provide an optical information processing apparatus for recording and/or reproducing information onto/from an optical recording medium by using the focus error detection apparatus.

According to one aspect of the invention, an astigmatism is given to a light beam which is to be focused onto a recording medium (e.g., disk) and the reflected light modulated by two kinds of pits formed on the recording medium surface is detected by a photo-detector. When the light beam having the astigmatism is focused by a focusing lens, two orthogonal astigmatic foci are formed at remote positions and a circle of least confusion is formed at an almost center position between both of the astigmatic foci. The recording medium surface is provided with two kings of pits (or marks) which provide the same or identical modulation to the light beam when the recording medium surface is located at the circle of least confusion position and different modulations to the light beam when the recording medium surface is deviated from the circle of the least confusion position. These two kinds of pits or marks are respectively provided at a predetermined interval so that the light spot which is focused onto the recording medium surface is modulated at a predetermined period. For instance, when the recording medium is rotated at the CLV (Constant Linear Velocity), those pits or marks are provided at a fixed interval. When the recording medium is rotated at the CAV (Constant Angular Velocity), those pits or marks are provided such that the interval therebetween increases as the positions of the pits or marks approach the outer periphery of the disk so as to equalize the number of pits or marks which are provided per rotation. The light reflected by the recording medium surface and passed through the focusing lens is detected by the photo-detector, and a signal modulated by at least one pit or mark of the two kinds of pits or marks is extracted from the output of the photo-detector to obtain from the phase or level of the extracted signal a focus error detection signal in which a point when the recording medium surface is located at the circle of least confusion position between both of the astigmatic foci is set to a focal point (or zero point). The phase denotes the timing for the modulation which is applied to the light beam by the pits or marks and the level denotes the level of modulation which is applied to the light beam by the pits or marks. The photo-detector may include a photo-detector having one photo-detecting element or a multi-divided photo-detector having a plurality of photo-detecting elements. A focus error signal is detected by using the total or entire output of the photo-detector. According to the conventional astigmatism system mentioned above, the focus error detection signal is obtained by differentially detecting the change in intensity distribution of the light beam on the surface of the multi-divided photo-detector. Therefore, when the optical axis of the light beam is deviated on the photo-detector surface or its light intensity distribution changes, an offset occurs in the focus error detection signal. However, according to the invention, since the focus error, detection signal is obtained by using the total output of the photo-detector, it is sufficient to arrange the photo-detector in the light beam flux of the reflected light which passed through the focusing lens so as to detect a total light amount. There may be used a plurality of photo-detectors each of which is disposed innto te reflected light beam flux so as to detect a total light amount. The obtained focus error detection signal is hardly influenced by the deviation of the optical axis of the reflected light on the photo-detector surface and by the change in light intensity distribution. Therefore, there is no need to match the optical axis of the center of the photo-detector and the reflected light and the apparatus can be also easily assembled.

The focusing objective point is the position of the circle of least confusion between two astigmatic foci such that the cross section of the light beams becomes a circle. This position corresponds to the zero point position of the focus error detection signal. Therefore, the focusing objective point can be autonomously adjusted. According to the conventional astigmatism system, an astigmatism is given to the reflected light from the recording medium surface to thereby form two astigmatic foci, and the zero point of the differential output of the multi-divided photo-detector arranged at the circle of least confusion position at almost the center between the two astigmatic foci is set to the zero point of the focus error detection signal. Therefore, this zero point is independent of the position of the light spot which is irradiated onto the recording medium. As mentioned above, the in the conventional astigmatism system, it is required that point at which the data signal or the like becomes maximum or the point at which the amount of reflected lights which is returned to the light source becomes maximum is detected by another measuring system different from the focusing system so that this point is taken as the focusing objective point or the zero point of the focus error detection signal.

By using the focus error detection method according to the invention in combination with other wellknown focus error detection method, the error detection performance can be further improved. For instance, a two-stage servoconstruction can be realized if the focus error signal detected by the astigmatism system disclosed in the foregoing U.S. Pat. No. 4,293,944 or by the front-to-back differential system disclosed in U.S. Pat. No. 4,742,218, is used as a control signal when performing the rough pull-in operation of the focusing control while the focus error detection signal according to the invention is used as a control signal after the pull-in operation. With such a construction, the focusing pull-in operation becomes stable and even if the focusing servo-control is made inoperative due to a cause of a shock or the like, it can be soon made operative.

According to an embodiment of the invention, the signal modulated by the pits or marks is extracted from the total output of the photo-detector to obtain the focus error detection signal from the phase or level of the extracted signal. Thus, the focus error detection signal can be obtained without being influenced by the data pits or the like formed on the recording medium surface.

According to one feature of the invention, pits or marks which are previously formed on the recording medium surface at the positions which are mutually deviated in the direction perpendicular to the spot scanning direction are used as two kinds of pits or marks mentioned above. The light beam having an astigmatism is focused by the focusing lens in a manner such that the light spot intensity distribution on the recording medium surface changes in directions about ±45° with respect to the scanning direction of the spot in accordance with a focus error. This this distribution becomes an isotropic distribution pattern in an in-focus condition. The light reflected by the recording medium surface and passed through the focusing lens is detected by the photo-detector. The signal modulated by at least one pit or mark of the two kinds of pits or marks is extracted from the total output of the photo-detector to obtain the focus error detection signal from the phase of the extracted. For instance, the signals which are respectively modulated by the two kinds of pits are extracted and a difference between the average time period of these modulated signals and the timing of the modulated signal from one of the two kinds of pits is detected, thereby obtaining the focus error detection signal. Since this focus error detection signal is detected from the phase of the signal modulated by the pit, it is hardly influenced even if the light intensity of the light beam changes. On the other hand, by detecting the level difference between the modulated signals by the two kinds of pits, the track error detection signal can be derived. The two kinds of pits or marks can be commonly used to detect both of the focus error and the track error.

According to another feature of the invention, long pits or marks which are previously formed in one of orthogonal directions on the recording medium surface and long pits or marks formed in the other direction are used as the two kinds of pits or marks. Preferably, one of the two kinds of long pits or marks formed respectively in the orthogonal directions is formed longly in the scanning direction of the spot and the other is formed longly in the direction perpendicular to the spot scanning direction. When the light beam having the astigmatism is focused by the focusing lens, the light spot distribution on the recording medium changes in one of the longitudinal directions of the two kinds of long pits in accordance with the focus error. This distribution becomes an isotropic distribution pattern in an in-focus condition. The light reflected by the recording medium surface and passed through the focusing lens is detected by the photo-detector and the signal modulated by at least one of the two kinds of pits or marks is extracted from the total output of the photo-detector, thereby obtaining the focus error detection signal from the level of the extracted signal. For instance, the signals which are respectively modulated by the two kinds of pits or marks are extracted and the difference between the levels of these modulated signals is detected, thereby obtaining the focus error detection signal.

Information is recorded and reproduced along the tracks in the regions where none of the two kinds of pits or marks for the focus error detection is formed. According to one feature, the two kinds of pits are intermittently formed along the tracks on the recording medium surface so as to alternately appear at regular time intervals and the areas among the pits are used as recording areas of information (user's data). According to another feature, the two kinds of pits are provided as a pair and this pair of pits are intermittently formed along the tracks on the recording medium surface so as to appear at regular time intervals and the area between a certain pair of pits and another pair of pits is used as the recording area of information. Preferably, the two kinds of pits or marks have a phase structure or a convex/concave structure and are previously formed on the recording medium surface. On the other hand, guide grooves to guide the light spot may be also previously formed in the information recording area between the pits or marks. Further, address information indicative of each track address, a sync signal to record data, and the like can be also preliminarily formed as necessary. In the case of previously forming the two kinds of pits or marks, guide grooves, or the like by the phase structure, it is preferable to set the pit or mark to an optical depth of ¼ of the wavelength of light beam which is used to record or reproduce and to set the guide groove to an optical depth of ⅛ of the light beam wavelength.

The present invention also discloses a recording apparatus or a cutting machine to form the pits or marks or guide grooves.

These and other objects and many of the attendant advantages of this invention will be readily appreciated as the same becomes better understood by reference to the following detailed description when considered in connection with the accompanying drawings.

BRIEF DESCRIPTION OF THE DRAWINGS

FIGS. 1 to 4 are diagrams for explaining the operation principle of a focus error detection method according to the present invention.

FIG. 1 is a diagram showing a focusing state of light beams having an astigmatism.

FIG. 3 is a diagram showing a focusing state of the light beam having an astigmatism and also showing the relation between the spot and the pit on the recording medium surface.

FIGS. 5 to 12 are diagrams for explaining an embodiment of the present invention.

FIG. 5 is an arrangement diagram of an optical information processing apparatus having a focus error detection apparatus of the invention.

FIG. 7 is a block diagram showing an example of a control circuit for automatic focusing and tracking servo-control.

FIGS. 8, 9a, 9b, 9c, 10a, 10b, 10c, 10d, 11, and 12 are waveform diagrams for explaining the focus error detecting operations.

FIGS. 13 to 19b are diagrams showing modifications of the embodiment of FIG. 5.

FIG. 13 is a diagram showing one modification of an optical system and a photo-detector.

FIG. 14 is a diagram for explaining the operation of FIG. 13.

FIG. 15 is a diagram showing another modification of the photo-detector.

FIG. 16 is a diagram showing a modification of pits formed on the recording medium surface.

FIG. 17 is a block diagram showing an example of a pattern recognizing circuit to detect the positions of the pits formed on the recording medium surface.

FIG. 18 is a diagram showing another example of an automatic focusing and tracking servo-control circuit.

FIGS. 19a and 19b are block diagrams for explaining another method of obtaining a time interval between pits 51 and 52.

FIGS. 20 to 23i are diagrams for explaining an embodiment of the invention.

FIG. 20 is an arrangement diagram of an optical information processing apparatus having a focus error detection apparatus of the invention.

FIG. 22 is a block diagram showing an example of an automatic focusing servo-control circuit.

FIGS. 23a, 23b, 23c, 23d, 23e, 23f, 23g, 23h, and 23i are waveform diagrams for explaining the focus error detecting operations.

DESCRIPTION OF THE PREFERRED EMBODIMENTS

The principle of a focus error detection method according to the present invention will be first described with reference to FIGS. 1 to 4c.

Figure 1:
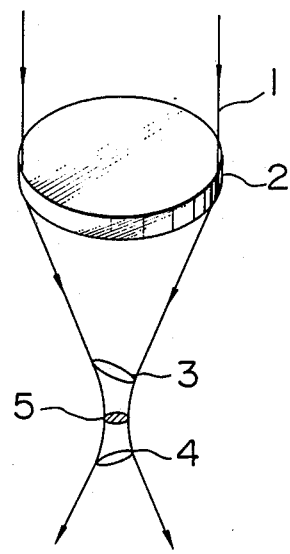
Figure 2A:
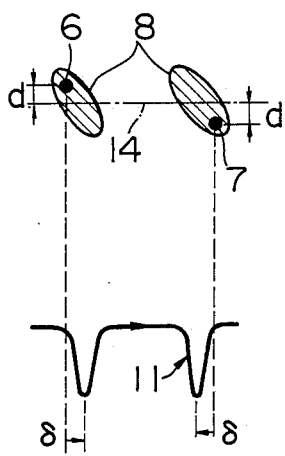
FIGS. 2a, 2b, and 2c are diagrams showing the relation between a spot focused onto a recording medium surface and pits and a state of a reflected light intensity-modulated by the pits and also showing the case of obtaining a focus error detection signal from the phase of the modulated signal.
Figure 2B:
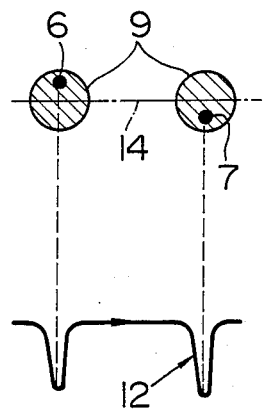
Figure 2C:
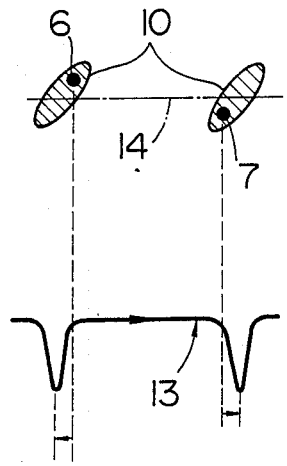

As shown in FIG. 1, for instance, when a light beam 1 having an astigmatism is focused by a focusing lens 2, astigmatic foci or caustic surfaces 3 and 4 are formed in the directions which are orthogonal to each other. The focused light beam becomes a circle at the position of the circle of least confusion 5 almost at the center position between these astigmatic foci. The upper portions in FIGS. 2a to 2c show states on a recording medium surface, e.g., on a disk surface. It is now assumed that the center of the focused spot scans on the center line 14 of a track. Pits or marks 6 and 7 are formed at the positions which are deviated in the opposite directions from the center line 14 by an equal distance d.

FIG. 2a shows the case where a recording medium (disk) is located at the focal line 3 in FIG. 1. A spot 8 on the recording medium becomes an ellipse. When the spot 8 moves in the direction from the pit 6 to the pit 7, a reflected light amount corresponding to the portion which is modulated by the pit 6 is delayed as shown by 11 in the lower portion and the portion which is modulated by the pit 7 advances. FIG. 2b shows the case where the recording medium (disk) is located at the circle of least confusion position 5. A spot 9 on the recording medium becomes a circle. When the spot 9 moves in the direction from the pit 6 to the pit 7, the reflected light amount is modulated as shown by 12 when the spot passes through each pit. FIG. 2c shows the case where the recording medium (disk) is located at the position of the focal line 4. A spot 10 on the recording medium becomes an ellipse. When the spot 10 moves in the direction from the pit 6 to the pit 7, the reflected light amount corresponding to the portion modulated by the pit 6 progresses as shown by 13 and the portion modulated by the pit 7 is delayed. In this manner, the light intensity distribution of the spot which is formed on the recording medium changes in directions about 45° with respect to the scanning direction of the spot in accordance with the position of the recording medium. The pits or marks 6 and 7 on the recording medium apply the same or identical modulation (FIG. 2b) to the spot 9 when the recording medium surface is located at the circle of least confusion position and apply the different modulations to the spot 8 or 10 when the recording medium surface is deviated from the circle of least confusion position (FIG. 2a or 2c). Therefore, the focus error detection signal cam be obtained in such a manner that the light reflected by the recording medium and passed through the focusing lens is detected by a photo-detector to convert the reflected light amount into the electric signal, and the delay or advancement of the phase, e.g., time of the signal modulated by the pit 6 or 7 is detected.

Figure 3:
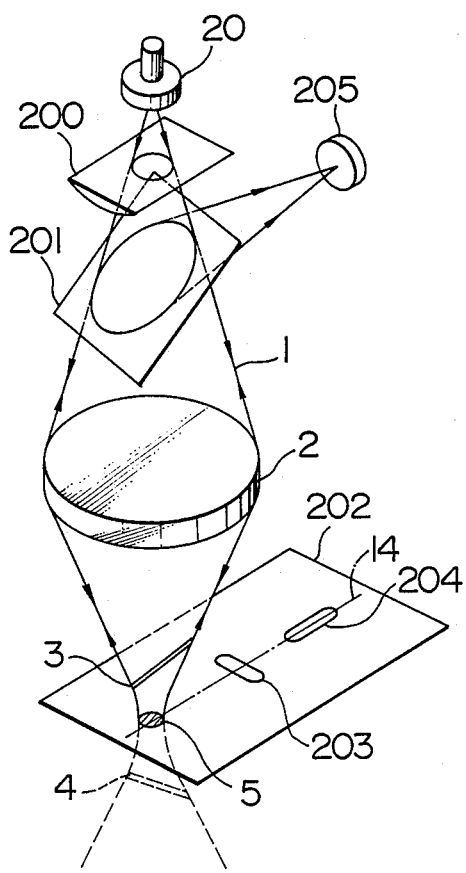
Figure 4A:
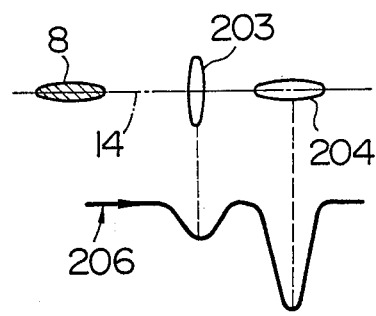
FIGS. 4a, 4b, and 4c are diagrams showing the relation between the spot and the pits and a modulated state of the reflected light and also showing the case of obtaining a focus error detection signal from the level of the modulated signal.
Figure 4B:
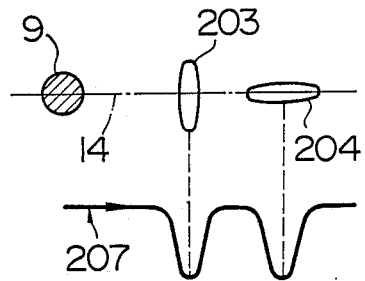
Figure 4C:
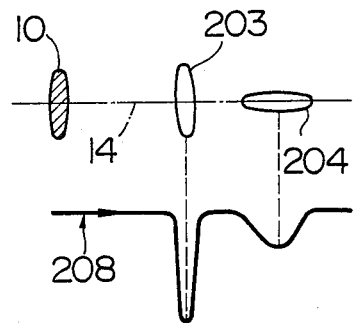

Although the case of obtaining the focus error detection signal from the phase of the signal modulated by the pit has been described above, the focus error detection signal can be also obtained from the level of the signal modulated by the pit. As shown in FIG. 3, an astigmatism is given to the light beam 1 emitted from a light source such as a semiconductor laser 20 or the like by an astigmatism optical device (e.g., a cylindrical lens) 200. The light beam 1 is then focused by the focusing lens 2 onto a recording medium 202. A pit 203 which is long in the direction of the focal line or caustic surface 4 and a pit 204 which is long in the direction of the focal line or caustic surface 3 are formed on the surface of the recording medium 202. The spot of the light beam 1 focused onto the surface of the recording medium 202 scans the center line 14. The light reflected by the recording medium and passed through the focusing lens 2 is reflected by a beam splitter 201 and detected by a photo-detector 205. FIG. 4a shows the case where the recording medium is located on the focal line 3. The spot 8 on the recording medium becomes an ellipse which is long in the track direction. When the elliptic spot 8 moves in the direction from the pit 203 to the pit 204, the level of a reflected light amount 206 which is modulated by the pit 203 is small and the level of the reflected light amount 206 which is modulated by the pit 204 is large. FIG. 4b shows the case where the recording medium is located at the circle of least confusion position 5. The spot 9 on the recording medium becomes a circle. When the circular spot 9 moves in the direction from the pit 203 to the pit 204, the level of a reflected light amount 207 which is modulated by the pit 203 is equal to the level of the reflected light amount 207 which is modulated by the pit 204. FIG. 4c shows the case where the recording medium is located at the position of the focal line 4. The spot 10 on the recording medium becomes an ellipse which is long in the direction perpendicular to the track. When the elliptic spot 10 moves in the direction from the pit 203 to the pit 204, the level of a reflected light amount 208 which is modulated by the pit 203 is large and the level of the reflected light amount 208 which is modulated by the pit 204 is small. In this manner, by providing the pits 203 and 204 which are long in orthogonal directions on the recording medium surface and by focusing the light beam having an astigmatism onto the recording medium surface, the light intensity distribution of the spot which is formed on the recording medium changes in one of the orthogonal directions in accordance with the position of the recording medium. Thus, the pits or marks 203 and 204 on the recording medium apply the same modulation to the spot 9 when the recording medium surface is located at the circle of least confusion position (FIG. 4b) and apply the different modulations to the spot 8 or 10 when the recording medium surface is deviated from the circle of least confusion position (FIG. 4a or 4c). Therefore, the focus error detection signal is obtained by comparing the levels of the reflected light which are modulated by the pits 203 and 204, respectively.

As will be obvious from the above description, according to the invention, the focusing objective point corresponds to the circle of least confusion position 5 at which the cross section of the light beam having the astigmatism between the two focal lines 3 and 4 becomes a circle and this position is also the zero point position of the focus error detection signal. Therefore, the focusing objective point can be autonomously adjusted. Moreover, since the focus error detection signal is derived by using the total or entire output of the photo-detector, it is sufficient to arrange the photo-detector into the light beam of the reflected light passed through the focusing lens so as to receive the total light amount. Therefore, it is possible to obtain the focus error detection signal which is hardly influenced by the deviation of the optical axis of the reflected light on the photo-detector surface and by the change in light intensity distribution. As a result, there is also no need to match the optical axes of the center of the photo-detector and the reflected light and the apparatus can be easily assembled.

According to the invention, as the two-kinds of focus error detecting pits or marks 6 and 7 or 203 and 204 mentioned above, their types are not limited so long as they can apply the modulation to the reflected light amount of the scanning spot. However, it is desirable to preliminarily form the pits or marks of the phase or concave/convex structure onto the recording medium surface.

Figure 5:
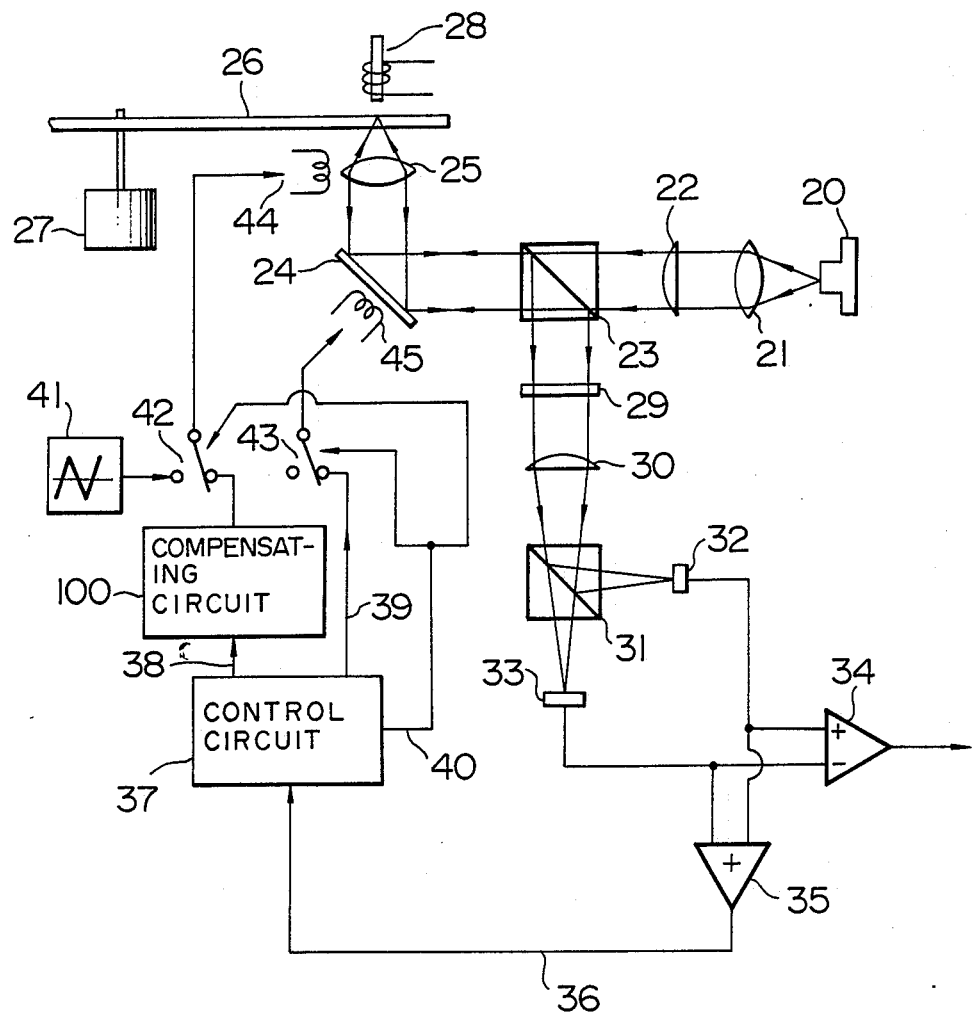

An embodiment of the present invention will now be described with reference to FIGS. 5 to 12. FIG. 5 shows an example of an optical information processing apparatus having the focus error detecting apparatus according to the invention. In this example, the invention is applied to a magneto-optical disk device. The light beam emitted from the light source such as semiconductor laser 20 or the like is collimated into the parallel light beam by a collimating lens 21. An astigmatism is given to the parallel light beam by a cylindrical lens 22 as an astigmatism device. This light beam then passes through a beam splitter 23 and is reflected by a mirror 24 and focused onto a disk 26 by a focusing lens 25. The disk 26 is rotated by a motor 27. A magnet 28 is provided to apply a magnetic field to the disk 26 to thereby record or erase magneto-optical domains. The light reflected from the disk passes through the focusing lens 25 and is reflected by the mirror 24 and beam splitter 23. Since the polarized direction of the reflected light is rotated (Kerr rotation) in dependence on the magnetization direction of the magneto-optical domains recorded on the disk 26, the difference between outputs of photo-detectors 32 and 33 to detect the lights which are divided by a half wave plate 29 and a polarizing beam splitter 31 is obtained by a differential circuit 34, so that a magneto-optical signal can be reproduced. A convex lens 30 is provided to converge the light beam onto the photo-detectors 32 and 33. The outputs of the photo-detectors 32 and 33 become a total reflection light amount signal 36 by an adder 35. The signal 36 is input to a control circuit 37, so that a focus error detection signal 38, a track error detection signal 39, and a switching signal 40 are obtained.

Figure 6A:
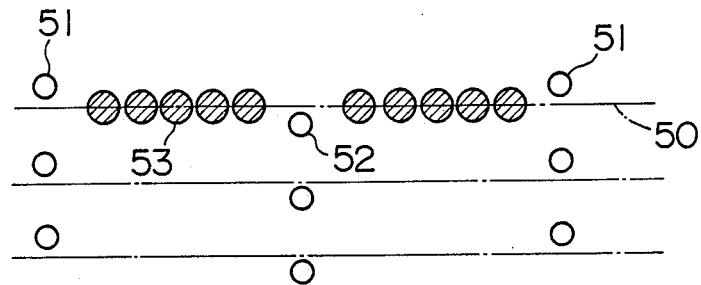
FIGS. 6a and 6b are diagrams showing states on the recording medium surface.

As shown in FIG. 6a, pits 51 and 52 are formed on the disk 26 at the positions which are deviated from each other at regular time intervals along a track center line 50. The pits 51 and 52 are provided at a predetermined interval such that the light spot which is focused onto the disk can be modulated at a predetermined period. For instance, when the disk is rotated at the CLV, the pits 51 and 52 are formed at a fixed interval. When the disk is rotated at the CAV, the pits 51 and 52 are formed so that an interval therebetween increases as the positions of the pits approach the outer periphery so as to equalize the number of pits which are formed every rotation. It is preferable that the pits 51 and 52 have a phase structure or a concave/convex structure and are previously formed on the disk surface. For example, it is desirable to set the pits 51 and 52 to an optical depth (refractive index of the disk base plate x actual depth) of 1/4 of the wavelength of light beam which is used to record or reproduce. Address information indicative of each track address, a sync signal to record data, and the like may be also preliminarily formed as necessary.

Information is recorded along the center line of the track into the areas where none of the pits 51 and 52 is formed. That is, as shown in FIG. 6a, a magnetic domain 53 is recorded along the track center line into the recording area between the pits 51 and 52.

Figure 6B:
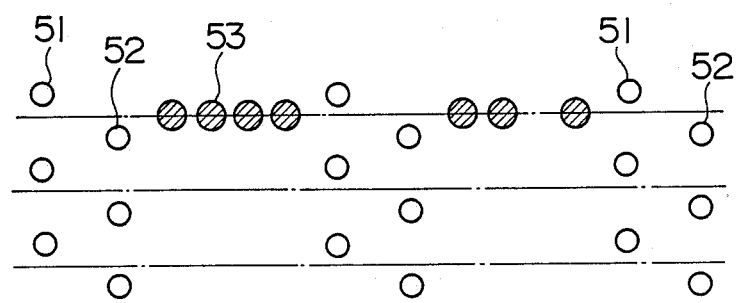

As shown in FIG. 6b, the pits 51 and 52 may be provided as a pair and the pairs of pits 51 and 52 are intermittently provided so as to appear at regular time intervals. The area between a certain pair of pits 51 and 52 and another pair of pits 51 and 52 can be used as the information recording area.

The magnetic domain 53 is recorded by simultaneously performing the irradiation of the light spot and the application of the magnetic field from the magnet 28. However, the domain 53 can be also recorded by a light intensity modulation recording in which the intensity of the magnetic field is set to be constant and the light intensity of the light spot is changed in accordance with information to be recorded or by a magnetic field modulation recording in which the light intensity of the light spot is set to be constant and the intensity or polarity of the magnetic field is changed in accordance with information to be recorded.

Returning to FIG. 5, the disk 26 is rotated by the motor 27, a switch 42 is connected to an oscillator 41 and a switch 43 is connected to the open side. When a lens actuator 44 slowly raises the focusing lens 25 from the bottom in response to an output of the oscillator 41, the total reflection light amount signal 36 increases as shown by a solid line 401 in FIG. 8 as the focusing lens position approaches the focal point. The switching signal 40 is turned on at a slice level 402 of a level slicing circuit 61 at which the pits 51 and 52 on the disk can be detected. The switches 42 and 43 are respectively switched to the focus error detection signal 38 and track error detection signal 39. The auto focusing control and auto tracking control are started.

Figure 7:
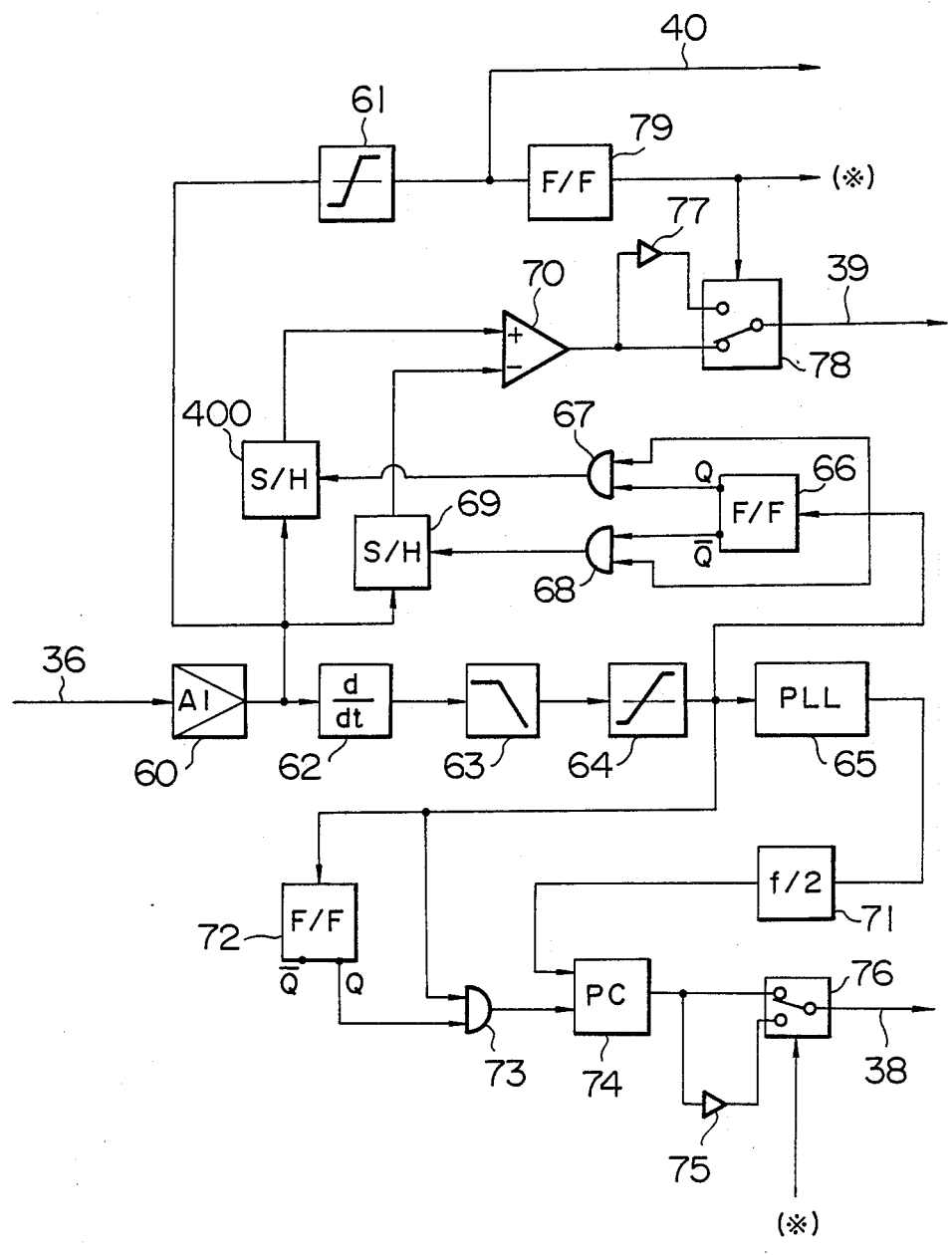

FIG. 7 is a block diagram of the control circuit 37. The total reflection light amount signal 36 passes through an amplifier 60 and the switching signal 40 is output from the level slicing circuit 61. On the other hand, an output of the amplifier 60 passes through a differentiating circuit 62, a low pass filter 63, and a zero comparator 64 and is shaped to a pulse waveform. The signals modulated by the pits 51 and 52 are extracted. A solid line 80 in FIG. 9a denotes a waveform of the total reflection light amount signal 36. A solid line 81 in FIG. 9b denotes an output waveform of the differentiating circuit 62. A solid line 82 in FIG. 9c denotes an output waveform of the zero comparator 64. In FIGS. 9a to 9c, the waveforms are depicted with respect to a common time axis or a common abscissa.

The focus error detection will be first described.

Figure 10A:
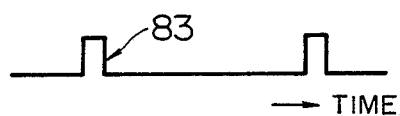
Figure 10B:
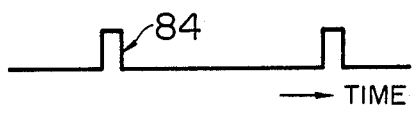
Figure 10C:
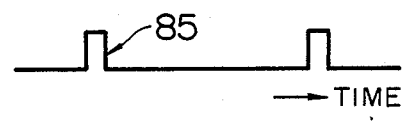
Figure 10D:
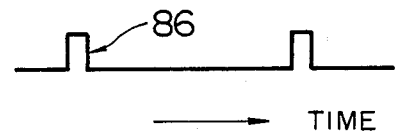
Figure 11:
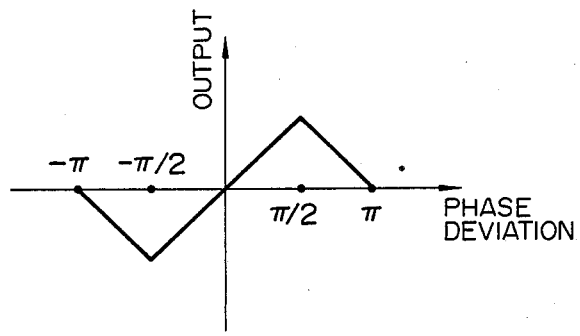

An output of the zero comparator 64 is input to a phase locked loop (PLL) 65. When a response frequency of the PLL is set to a value which is enough lower than the periods of the pits 51 and 52, even if the timings of the pits 51 and 52 are fluctuated every pit, the pulse of the average period of the pits 51 and 52 is obtained. Further, a pulse of the half frequency is derived by a frequency dividing circuit 71. On the other hand, the output of the zero comparator 64 is supplied to a flip-flop circuit 72 and an AND circuit 73, so that a modulated signal corresponding to the pit 51 or 52 is obtained. Although the frequencies of output pulse trains of the frequency dividing circuit 71 and AND circuit 73 are equal, the phase of the output of the AND circuit 73 is shifted due to the focus error. FIG. 10a shows an output waveform of the frequency dividing circuit 71 and a reference pulse 83 of a predetermined phase is output irrespective of the focus error. FIG. 10b shows an output waveform of the AND circuit 73 when the focus error described in FIG. 2a occurred. The phase of a pulse 84 modulated by the pit 6 or 51 in FIGS. 2a to 2c or FIG. 6 is delayed than that of the reference pulse 83. FIG. 10d shows an output waveform of the AND circuit 73 in the case of FIG. 2c where the focal point was deviated in the direction opposite to that of FIG. 2a. The phase of a pulse 86 modulated by the pit 6 or 51 is advanced than that of the pulse 83. As shown in FIG. 10c, the phase of a pulse 85 modulated by the pit 6 or 51 coincides with that of the reference pulse 83 at the in-focus point. Therefore, the focus error detection signal 38 can be obtained by using a phase comparator 74 whose output voltage changes due to the phase error as shown in FIG. 11. The focus error detection signal 38 is input to the lens actuator 44 through a compensating circuit 100 of the control system and the lens 25 is vertically moved, thereby enabling the auto focusing control to be executed.

In the embodiment, since the focus error detection signal 38 can be detected from the phase of the signals modulated by the pits 51 and 52, by detecting the difference between the levels of these modualted signals, the track error detection signal can be obtained. The pits 51 and 52 can be commonly used for both of the focus error detection and the track error detection.

Figure 12:
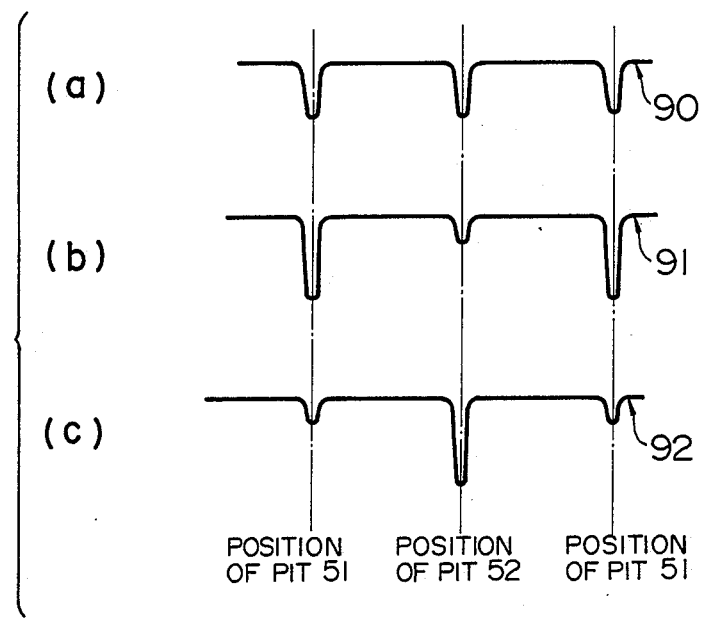

The output of the zero comparator 64 is input to a flip-flop 66. A Q terminal output and a Q terminal output are input to AND circuits 67 and 68 together with the output of the zero comparator 64, respectively. Thus, the sampling timing signal when modulated by the pit 51 and the sampling timing signal when modulated by the pit 52 can be obtained. When the spot scans on the track center line 50 shown in FIGS. 6a and 6b, the amounts which are modulated by the pits 51 and 52 are equal and a waveform of the reflection light amount shown by a solid line 90 in (a) in FIG. 12 is obtained. When the spot scans the upper side of the paper surface than the track center line 50 in FIGS. 6a and 6b, the amount which is modulated by the pit 51 is large and a waveform as shown by a solid line 91 in (b) in FIG. 12 is obtained. When the spot scans the lower side of the paper surface than the track center line 50, the amount which is modulated by the pit 52 is large and a waveform as shown by a solid line 92 in (c) in FIG. 12 is obtained. Therefore, the output of the amplifier 60 in FIG. 7 is input to two sample and hold circuits 400 and 69 and sampled by the sampling timing signals from the AND circuits 67 and 68. Thereafter, the difference between those signals is calculated by a differentiating circuit 70, so that the track error detection signal 39 is obtained. The track error detection signal 39 is input to a mirror actuator 45 in FIG. 5 and the tracking control is executed by rotating the mirror 24 so that the spot scans the track center line 50. In place of controlling the mirror 24, the lens actuator 44 is constructed as a two-dimensional actuator which can control in two directions of the optical axis direction and tracking direction and the tracking control may be performed by moving the lens 25 by this actuator.

If the pits 51 and 52 are erroneously distinguished, there is a case where the focus error detection signal exhibits the opposite characteristic and the auto focusing control mode cannot be set. In such a case, as shown in FIG. 7, inverting circuits 75 and 77 and switching circuits 76 and 78 are provided for the focus error detection signal 38 and track error detection signal 39. The polarities of those signals are inverted by an output of a flip-flop circuit 79 which inverts the output in response to the switching signal 40. Thus, in the second focus setting operation, since the polarities of both of the detection signals 38 and 39 at the second time have been inverted from those at the first time, the auto focusing control mode and the auto tracking control mode can be set. If these modes cannot be set even at the second time, these processes are repeated more times. The completion of this setting operation can be discriminated by checking to see if the signal level from the pit has exceeded the slice level 402 or not even after the elapse of the time (about 1 msec) which is required for the setting operation by the level of the signal 401.

The invention is not limited to the above embodiment but can also use a laser whose astigmatism is, e.g., about 16 μm. In this case, by setting the NA of the collimating lens to 0.15 and the NA of the focusing lens to 0.53, the cylindrical lens 22 in FIG. 5 becomes unnecessary. The astigmatism of the focusing spot is set to 1.4 μm and the wave front aberration is set to 1/5 wavelength. Therefore, the focus error can be accurately detected without a deterioration of the recording and reproducing characteristics.

By using the focus error detection method of the invention together with the conventional focusing system, the performance can be further improved since the focusing objective point is set by the self-alignment method.

Figure 13:
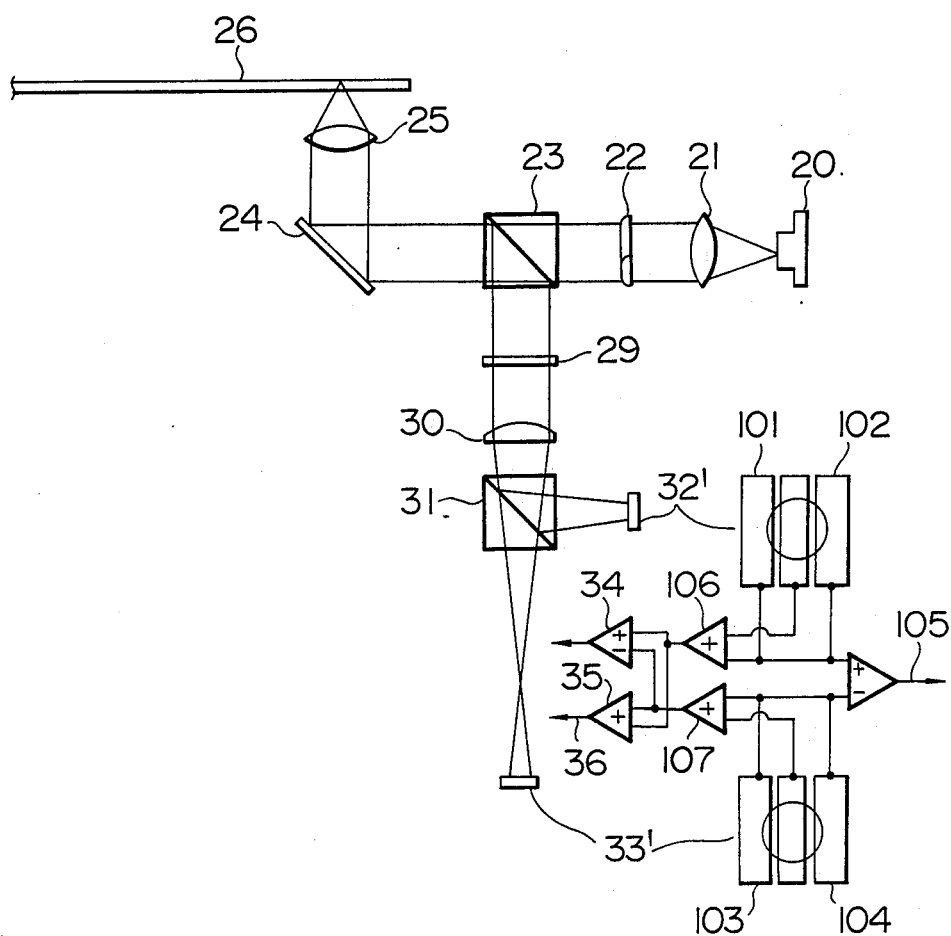

FIG. 13 shows an example in which the focus error detection method of the invention is used together with the conventional focusing system. In FIG. 13, since the focus servo-system and tracking servo-system are the same as those in the embodiment of FIG. 5, they are omitted. The same parts and components as those in FIG. 5 are designated by the same reference numerals. For instance, the front-to-back differential system disclosed in U.S. Pat. No. 4,742,218 is used as the conventional detection system. Three-divided photo-detectors 32' and 33' are arranged before and after the focal surface on the image side as shown in the diagram. A pair of detectors 101 and 102 are arranged on both sides of a center photo-detector 32'. Another pair of detectors 103 and 104 are arranged on both sides of a center photo-detector 33'. The sum of outputs of the pair of detectors 101 and 102 is calculated. The sum of outputs of the pair of detectors 103 and 104 is calculated. The difference between these sums is calculated, thereby obtaining a focus error detection signal 105. The total output of the photo-detector 32' is obtained by an adder 106. The total output of the photo-detector 33' is obtained by an adder 107. The difference of outputs of the adders 106 and 107 is calculated by the differential circuit 34 and is used as a magneto-optical signal. The sum of the outputs of the adders 106 and 107 is calculated by the adding circuit 35 and is used as the total reflection light amount signal 36. The focus error detection signal 38, track error detection signal 39, and switching signal 40 are obtained from the signal 36 in a manner similar to the embodiment of FIG. 5.

Figure 14:
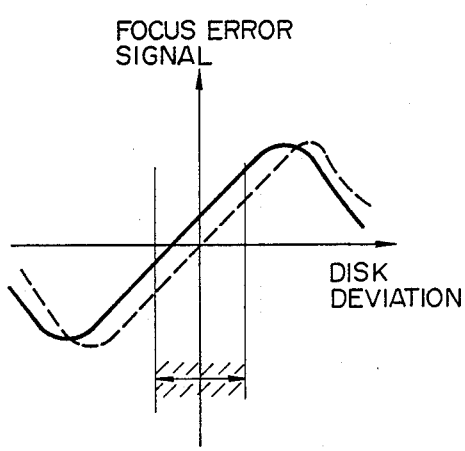

When the position of the photo-detector is deviated, the focus error detection signal 105 by the front-to-back differential system for the focus error causes an offset as shown by a solid line from the normal characteristic as indicated by a broken line as shown in FIG. 14. In this state, the focus is set to the wrong position. However, even if any offset is caused, the polarity does not change. Therefore, this signal can be used as a control signal when performing the rough pull-in operation in the case of performing the focusing operation according to the invention as mentioned in the foregoing embodiment. That is, in FIG. 14, in a region out of the range of the area as shown by a hatched area where the stable focus error detection signal 38 according to the invention is output, the focus error detection signal 105 is used as a control signal to drive the lens actuator 44. In the hatched area, the focus error detection signal 38 according to the invention which was detected from the total reflection light amount signal 36 by the control circuit 37 in FIG. 7 is used as a control signal to drive the lens actuator 44. In this manner, the two-stage servo-control is constructed. Due to this, the focusing pull-in operation also becomes stable. Even if the focal point is deviated from the hatched area due to some causes, the focusing operation can be soon recovered.

Figure 15:
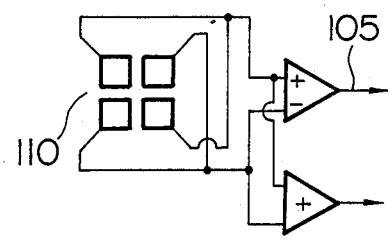

In the embodiment of FIG. 5, the astigmatism effect similar to which occurred on the object side of the objective lens (focusing lens) 25 also occurs on the image side. Therefore, as another modification, in place of the foregoing focusing system by the front-to-back differential system, by using together the subject matter of the present invention and the focus error detection signal by the well-known astigmatism detection system disclosed in U.S. Pat. No. 4,293,944 or the like, the similar effect can be also derived. That is, as a type of either one of the photo-detectors 32 and 33 in FIG. 5, a four-divided photo-detector 110 as shown in FIG. 15 is used. The difference between the sum signals of the opposite two pairs of photo-detecting sections of the detector 110 is calculated and the focus error detection signal 105 is obtained and used together with the focus error detection signal 38 according to the invention. The sum of outputs of all of the photo-detecting sections of the four-divided photo-detector 110 is input to the adder 35 in FIG. 5 and added to the output of the other photo-detector. The resultant added output is used as the total reflection light amount signal 36. The focus error detection signal 38, track error detection signal 39, and switching signal 40 are derived from the signal 36 in a manner similar to the embodiment of FIG. 5.

As another method of distinguishing the pits 51 and 52, the following method can be mentioned. If the tracks on which data is recorded can be discriminated, the pits 51 and 52 can be distinguished by obtaining the phases of the zig-zag patterns of the pits 51 and 52 because these phases are predetermined with certain regularities with respect to the track center.

Figure 16:
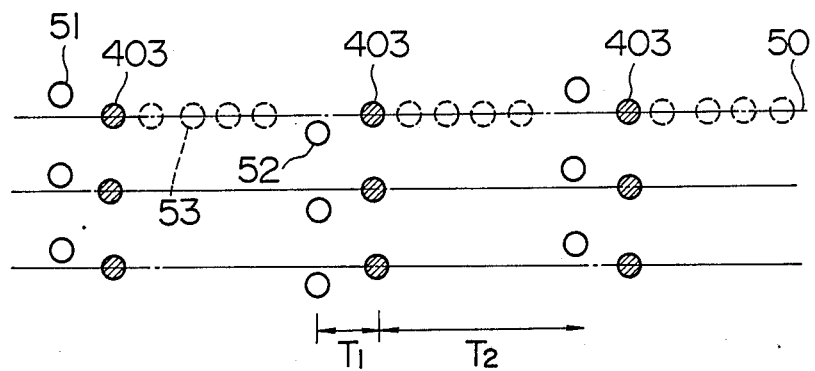

Therefore, as one modification, it is sufficient to previously form a special prepit which is located at the track center and indicates the positional relation between the pits 51 and 52. For instance, a pit 403 is arranged together with the pits 51 and 52 on the track center line 50 as shown in FIG. 16.

In this modification, the type of pit is recognized in the following manner. The total reflection light amount signal 36 is differentiated by the differentiating circuit 62 and the zero cross point is found out by the zero comparator 64 in a manner similar to the above. With this method, the positions of the pits 51, 52, and 403 are derived and input to a pattern recognizing circuit. Since the time from the pit 51 to the pit 403, the time from the pit 51 to the pit 52, and the time from the pit 403 to the pit 52 are previously known, the positions of the pits 51, 52, and 403 can be known. At this time, the pulse signals of the pits 51, 52, and 403 are input to the PLL circuit 65 and a clock is generated and can be used for discrimination.

Figure 17:
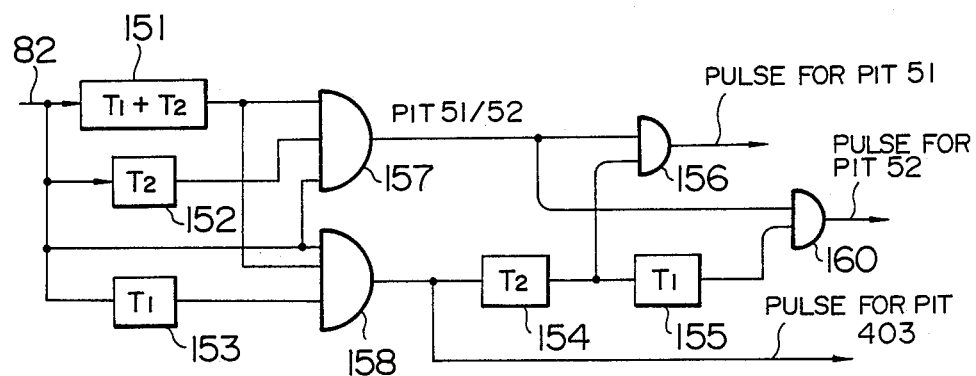

As a method of recognizing a pattern, as shown in FIG. 17, there is an embodiment in which delay lines 151 to 155 and AND gates 156 to 158, and 160 are combined. The pulses corresponding to the pits 51, 52, and 403 can be detected from the output 82 of the comparator 64. The delay line outputs a pulse having a width of ± Δtime around the point as a center which is delayed by only a predetermined delay time from the leading edge of the input pulse. The value of Δ is set to a value such that the difference between the prepits 51 and 52 and the clock signal of the average period which is generated from the PLL 65 is sufficiently included and no erroneous detection is caused.

Figure 18:
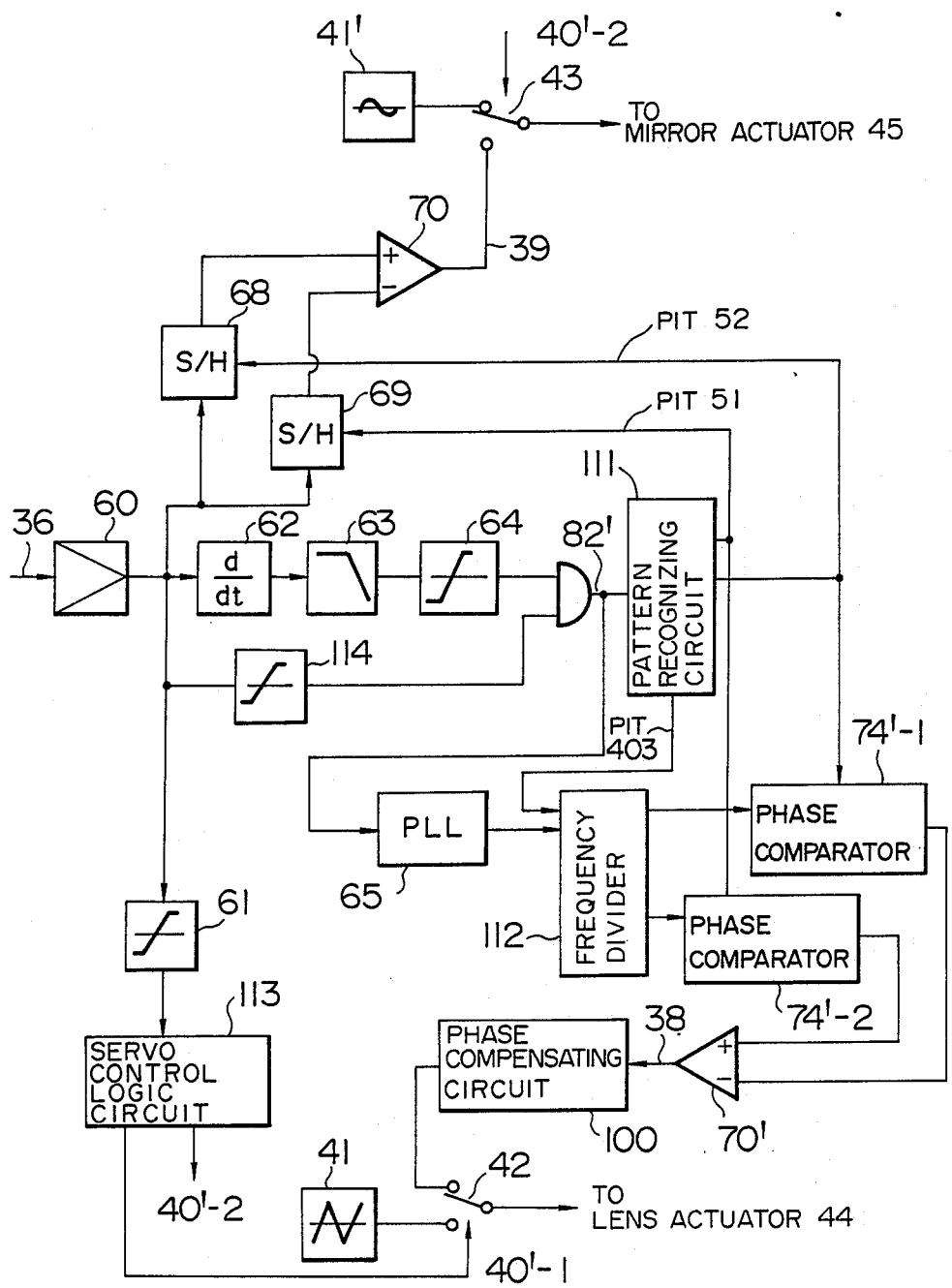

The operations of the auto focusing and auto tracking servo-control system in this modification will now be described with reference to FIG. 18. The content which has already been described in the above embodiments is not explained in detail. First, switching signals 40'-1 and 40'-2 as outputs of a servo system control logic circuit 113 are respectively set to the oscillator 41 and an oscillator 41'. The switching signals 40'-1 and 40'-2 are used to switch the switches 42 and 43. First, the focusing lens 25 is made to approach the disk 26 by a triangular wave signal from the oscillator 41. When the level of the signal from the prepit exceeds the slice level 402, the switch 42 is switched to the output from the phase compensating circuit 100 by the switching signal 40'-1.

On the other hand, the mirror actuator 45 is forcedly vibrated by the sine signal from the oscillator 41'. Due to this, the light spot always traverses a number of tracks. Even in the case of the disk having less decentering, the light spot can scan a number of prepits 51 and 52 and the focus error detection signal 38 can be stably detected. The total reflection light amount signal 36 is sliced by a comparator 114. The AND of an output of the comparator 114 and the zero cross pulse 82 of the differentiation signal 81 is calculated. Only when the signals modulated by the pits 51, 52, and 403 are a predetermined value or more, the resultant signal is used as a pit position signal 82'. With this construction, the erroneous operation due to defects, noises, and the like on the disk can be avoided. The pit position signal 82' detected in this manner is inputted to a pattern recognizing circuit 111 of a construction as shown in FIG. 17 and the pulse signals indicative of the positions of the pits 51, 52, and 110 are obtained. When the pulse signals corresponding to the pits 51, 52, and 110 are inputted to the PLL 65, the oscillation is performed at the frequency of the average period synchronized with them.

That is, when a frequency band of the PLL 65 is selected to a value which is sufficiently lower than a group of repetitive frequencies consisting of the pits 51, 52, and 110, the oscillation is carried out at the average period without being influenced by the fluctuations of the pits 51 and 52 which are caused due to the focus error and the frequency of the group of repetitive frequencies. Reference pulses corresponding to set points (points which are obtained when the correct focal point is set) of the pits 51 and 52 are outputted from a frequency dividing circuit 112 by using the pulse signal by the pit 110 detected by the pattern recognizing circuit 111 and the signal obtained from the PLL 65.

This reference pulse output is inputted to phase comparators 74'-1 and 74'-2 and its phase is compared with the phases of the pulse signals corresponding to the positions of the pits 51 and 52 (signals modulated by the pits 51 and 52 detected by the pattern recognizing circuit 111) and the resultant data are held. The difference between outputs of the phase comparators 74'-1 and 74'-2 is calculated by a differential circuit 70' to thereby obtaining the focus error detection signal 38. The lens actuator 44 is driven by the signal 38 and the focus-servo pull-in operation is performed. The value of the comparator 61 is then monitored by the servo system control logic circuit 113 for the period of time corresponding to the completion of the pull-in operation. After the completion of the pull-in operation was confirmed, the switch 43 is controlled by the switching signal 40'-2 and the track error detection signal 39 is sent to the mirror actuator 45, thereby starting the tracking servo pull-in operation.

In the foregoing embodiment, the clocks are generated by the PLL 65 from the signals modulated by the pits 51 and 52, thereby comparing the phases with the signals modulated by the pits 51 and 52. However, if the PLL operation is not correctly performed in the pull-in operation, the pull-in operation is not normally executed. Therefore, the time interval between the modulated signals by the pits 51 and 52 is directly measured and compared with the reference time which is determined by a preset distance between the pits, so that the focus error detection signal 38 is detected without using the PLL 65. For this purpose, the interval of the signal 82 in FIG. 9 is measured. That is, as shown in FIGS. 19a and 19b, the signal 82 is inputted to the counter 300 and time $T_m$ from the trailing edge of the pulse signal 82 by the pit 51 to the leading edge of the pulse signal 82 by the pit 52 is measured by using the counter 300. The value of the measured time $T_m$ is inputted to a subtracter 301. A predetermined pulse width time $t_l$ of the signal 82 and a reference time $T_s$ are inputted to the other input terminal of the subtracter 301, thereby calculating the difference between the time $T_m$ and the time $t_l+T_s$. The resultant value is inputted to a D/A converter 302 and used as the focus error signal. The method described in FIG. 18 can be used as a method of distinguishing the pits 51 and 52.

When the fluctuation of the rotation, off-centering, or the like of the disk is small, the time fluctuation on the disk is also small. Therefore, in such a case, the embodiment may be also applied to not only the pull-in operation but also the stationary tracking operation only by the use of the effect of comparison with the fixed time $T_s$, without using the PLL.

On the other hand, as a pre-pit pattern, in addition to the pattern of the pits 51, 52, and 110 in FIG. 16, it is also possible to use a pattern which is used in the format which has recently been proposed for the 5-inch optical disk. This pattern has been described in detail in "Optical Mass Data Storage II", SPIE., Vol. 695, pages 239 to 242, FIG. 2, (1986).

Although data is recorded in the areas among the pits 51, 52, and 110, it is also possible to combine the pits 51, 52, and 110 to one area, to intermittently provide these areas, and to record data among these areas.

An embodiment of the invention in which the focus error detection signal is obtained from the level of the modulated signal by the pits or marks will now be described with reference to FIGS. 20 to 23. FIG. 20 is a diagram showing the case where the focus error detection apparatus of the invention is used for the magneto-optical disk device in a manner similar to the embodiment of FIG. 5. The light emitted from the light source such as the semiconductor laser 20 or the like is collimated into the parallel light beam by the collimating lens 21. An astigmatism is given to this light beam by an astigmatism device such as the cylindrical lens 200 or the like. The light beam then passes through the beam splitter 23 and is reflected by the mirror 24 and is focused onto the surface of a disk 220 by the focus lens or focusing lens 25. As mentioned above, in the case of using a semiconductor laser having a large astigmatism as the light source, the astigmatism device such as the cylindrical lens 200 or the like becomes unnecessary.

When the light beam having the astigmatism is focused by the focusing lens 25, the light intensity distribution of the spot on the disk surface changes in accordance with the position of the disk surface as described in FIG. 4. The disk 220 is rotated by the motor 27. The magnet 28 is provided to apply the magnetic field to the disk 220 to thereby record or erase magneto-optical domains. The reflected light from the disk passes through the lens 25 and is reflected by the beam splitter 23 and divided into halves by the half wave plate 29 and a polarizing beam splitter 31 and detected by photo-detectors 221 and 222. Groove-type tracks to detect a track error are formed on the disk 220. Information is recorded and/or reproduced in the central portions of the grooves or along the center line between the adjacent grooves. The photo-detector 222 is divided into halves and two detection signals of the two-divided photo-detectors are supplied to a differential circuit 223 to obtain the difference therebetween. The track error detection signal 39 can be derived from this difference. On the other hand, two detection signals of the photo-detector 222 are added by an adding circuit 224. The difference between the added signal and the detection signal of the photo-detector 221 is calculated by a differential circuit 225, so that the magneto-optical signal can be reproduced. On the other hand, the output signal of the adder 224 and the signal of the photo-detector 221 are added by an adding circuit 226, so that the total reflection light amount signal 36 is derived and inputted to a control circuit 227. In this manner, the focus error detection signal 38 and switching signal 40 are obtained.

The oscillator 41 and the switches 42 and 43 are provided to start the auto focusing control and auto tracking control. The lens actuator 44 and mirror actuator 45 are provided to focus the light spot and to trace the track, respectively. Since the operations of these components have already been described in FIG. 5, their descriptions are omitted.

Figure 21A:
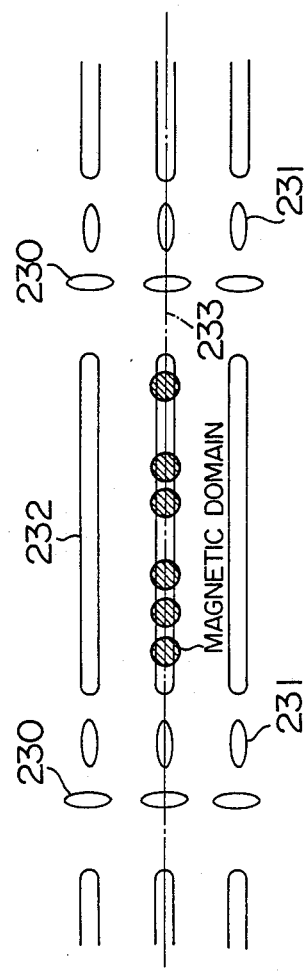
FIGS. 21a and 21b are diagrams showing states on the recording medium surface.

As shown in FIG. 21a, a number of concave or convex type pits 230 which are long in the radial direction of the disk and a number of concave or convex type pits 231 which are long in the track direction are intermittently formed along a track center line 233 on the disk 220 at a predetermined interval. These two kinds of pits 230 and 231 are used to detect a focus error.

In the example of FIG. 21a, when the disk is rotated at the CLV, pairs of pits 230 and 231 are repetitively formed at a predetermined interval. When the disk is rotated at the CAV, the pits 230 and 231 are formed so that an interval therebetween increases as the positions of the pits approach the outer periphery of the disk so as to equalize the number of pairs of pits 230 and 231 which are formed every rotation.

Information is recorded along the track center line 233 in the areas where none of the pits 230 and 231 is formed. In the example of FIG. 21a, grooves 232 to detect a track error are formed along the track center line in the information recording areas. For instance, it is desirable to set the pits 230 and 231 into an optical depth of ¼ of the wavelength of the light beam which is used to record or reproduce and to set the groove 232 to an optical depth of ⅛.

Address information indicative of each track address, a sync signal to record data, etc. can be also further preliminarily formed as necessary.

Figure 21B:
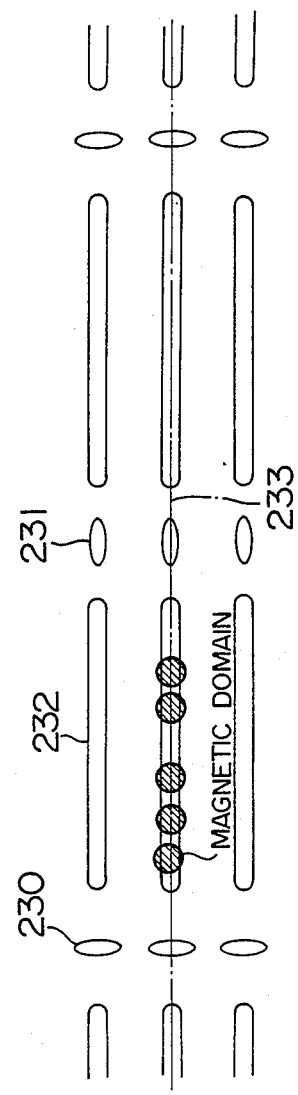

On the other hand, in the example as shown in FIG. 21b, the pits 230 and 231 are alternately formed at a predetermined interval and the area between the pits can be used as the information recording area.

Figure 27:
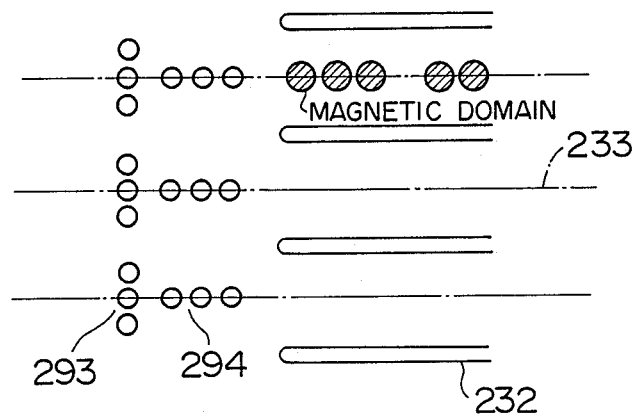
FIG. 27 is a diagram showing another example of pits and guide grooves which are formed on the recording medium surface.

Further, as shown in FIG. 27, the pits 230 and 231 can be also constructed by a plurality of pit groups 293 and 294, respectively. The grooves 232 are formed on both sides of the track center line 233 and information, e.g., magnetization domains can be also recorded or reproduced along the center line between the grooves.

Figure 22:
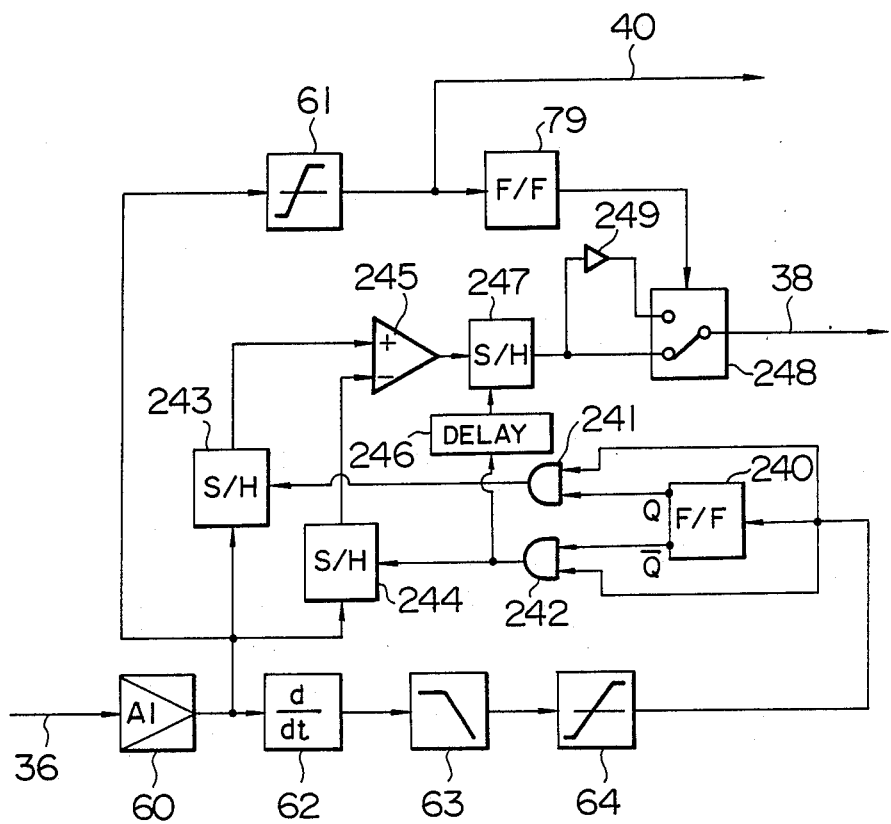
Figure 23A:
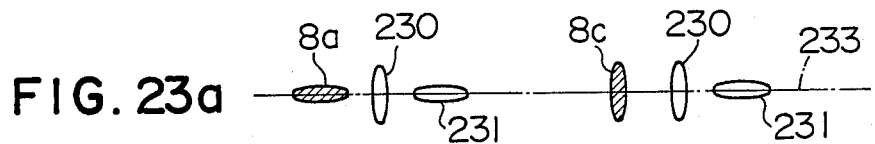
Figure 23B:
Figure 23C:
Figure 23D:
Figure 23E:
Figure 23F:
Figure 23G:
Figure 23H:
Figure 23I:
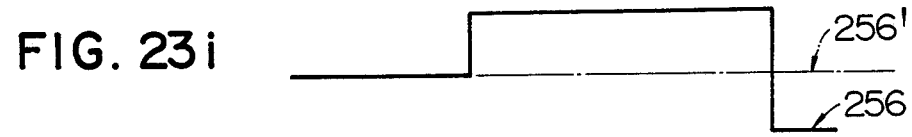

FIG. 22 is a block diagram of the control circuit 227. In a manner similar to FIG. 7, the total reflection light amount signal 36 passes through the amplifier 60 and the switching signal 40 is outputted by the level slicing circuit 61. An output of the amplifier 60 passes through the differentiating circuit 62, low pass filter 63, and zero comparator 64 and is shaped to a pulse waveform in a manner similar to FIG. 7. FIG. 23 shows a change in each signal depending on the elapse of time when the spot 8 focused onto the disk surface passes through the pits 230 and 231. For easy understanding, the left side shows the case of FIG. 4a and the right side shows the case of FIG. 4c. The total reflection light amount signal 36 is not modulated in the magneto-optical domains but modulated by the pits 230 and 231 as described in FIG. 4. A waveform 250 is an output signal waveform of the differentiating circuit 62. A waveform 251 is an output signal waveform of the zero comparator 64 and a timing signal when the spot passes through the pits 230 and 231 can be derived. This timing signal is inputted to an AND circuit 241 and to a flip-flop circuit 240. A Q terminal output signal which is outputted from the flip-flop circuit 240 is also inputted to another input terminal of the AND circuit 241. Thus, a timing signal as shown by a waveform 252 when the spot passes through the pit 230 is derived from the AND circuit 241. On the other hand, the timing signal from the zero comparator 64 is inputted to an AND circuit 242. A $\bar{Q}$ terminal output signal of the flip-flop circuit 240 is also inputted to another input terminal of the AND circuit 242. Thus, a timing signal as shown by a waveform 253 when the spot passes through the pit 231 is derived from the AND circuit 242. Therefore, by inputting the output signal of the amplifier 60 to a sample and hold circuit 243 and sampling by an output (waveform 252) of the AND circuit 241, an output signal of the sample and hold circuit 243 becomes as shown by a waveform 254. On the other hand, an output signal of a sample and hold circuit 244 by the waveform 253 becomes as shown by a waveform 255. Alternate long and short dash lines 254' and 255' indicate total reflection levels. When the difference between those output signals is calculated by a differential circuit 245, the resultant signal becomes as shown by a waveform 256. This signal becomes the focus error detection signal 38. However, in order to set the difference between the waveforms 254 and 255 just after the spot passed through the pit 231 to the focus error detection signal, the output of the AND circuit 242 is supplied to a delay circuit 246 having a slight delay time and the output of the differential circuit 245 is sampled and held by a sample and hold circuit 247 by the delayed signal of the delay circuit 246.

If the pits 230 and 231 are erroneously distinguished, in a manner similar to FIG. 7, the switching signal 40 is inputted to the flip-flop circuit 79. A switching circuit 248 which operates by an output signal of the flip-flop circuit 79 is used to thereby select an output of an inverting circuit 249. Due to this, the lens actuator 44 is driven by the focus error detection signal and the auto focusing control can be accomplished.

In a manner similar to the case described in FIGS. 13 to 15, the focus error detection method of the embodiment can be also used together with the conventional front-to-back differential system or astigmatism system.

A method of forming the focus error detecting pits 51 and 52 or 230 and 231 which are used in the invention will now be described. An example in the case of forming a pit pattern shown in FIG. 21a will be described.

The depths of the pits 230 and 231 on the surface of the disk 220 are set to the optical path length of ¼ of the waveform of the light beam which is used to record or reproduce. The depth of the groove 232 is set to the optical path length of ⅛ of the wavelength. These concave and convex shapes can be manufactured by a method of exposing and developing a photo-resist on a mother disk by a laser beam. First, a photo-resist of a thickness of the ¼ waveform is coated onto the glass mother disk and exposed by a cutting machine shown in FIG. 24. A laser beam emitted from an argon laser 262 of a wavelength 4579 Å is expanded by a beam expander 265 and reflected by a half mirror 270 and focused onto a glass mother disk 260 by a focusing lens 277. The spot on the glass mother disk 260 becomes an elliptic shape as shown by a spot 282 in FIG. 24 due to the function of a cylindrical lens 268 which is arranged in the optical path to the lens 268. On the other hand, the laser beam emitted from an argon laser 263 passes through the path consisting of a beam expander 266, a cylindrical lens 269, a half mirror 271, and a half mirror 270 and is focused onto the glass mother disk 260 by the focusing lens 277. In this case, the spot becomes a shape as shown by 283 in FIG. 25 due to the function of the cylindrical lens 269. On the other hand, a laser beam emitted from a helium neon laser 264 of a wavelength 6328 Å passes through an optical path consisting of a beam expander 267, a beam splitter 274, a quarter wave plate 273, a wavelength separating filter 272, and the half mirrors 271 and 270 and is focused onto the glass mother disk 260 by the focusing lens 277. The filter 272 transmits the lights near the wavelength 6328 Å and reflects the lights near the wavelength 4579 Å. Thus, only the helium neon laser beam among the reflected lights from the glass mother disk is transmitted through the filter 272 and reaches a focus error detection system 275 by the polarizing operation of the quarter wave plate 273 and a polarization beam splitter 274, so that a focus error detection signal 276 is obtained. The focusing lens 277 is driven by a lens actuator 278 in response to the signal 276, thereby performing the auto focusing control. The glass mother disk 260 is rotated by a motor 279 and slowly moves at a constant velocity on a rail 281 by a caster 280, so that spiral tracks can be exposed on the glass mother disk 260. The rotating direciton of the glass mother disk 260 is indicated by an alternate long and short dash line 284. By oscillating the laser 262 by a high output pulse, a photo-resist 261 is exposed by the shape of the spot 282. By oscillating the laser 263 by a high output pulse, the photo-resist 261 is exposed by the shape of the spot 283. By developing the glass mother disk 260 by a developing liquid, the pits 230 having the shape of the spot 282 and a depth of the ¼ wavelength and the pits 231 having the shape of the spot 283 and a depth of the ¼ wavelength are formed. By continuously oscillating the laser 263 by a weak power, the spot 283 is continuously irradiated in the rotating direction 284, so that the grooves 232 having a depth of the ⅛ wavelength are formed after the development.

Figure 24:
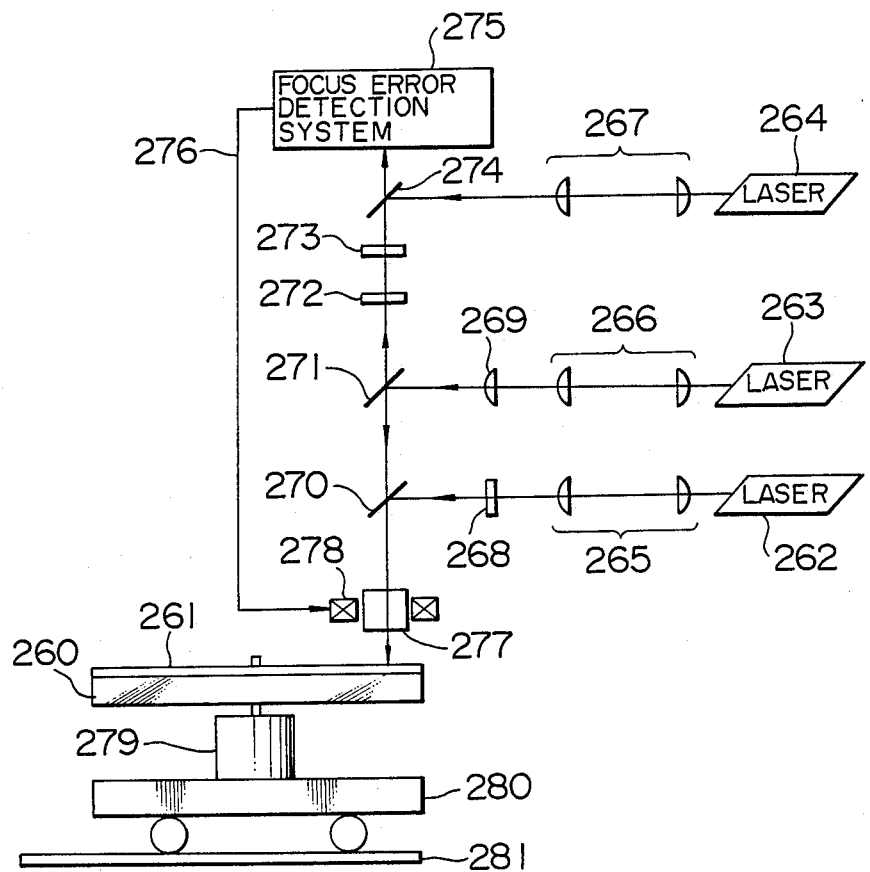
FIG. 24 is a schematic arrangement diagram of a recording apparatus or a cutting machine to form pits or marks or guide grooves.
Figure 25:
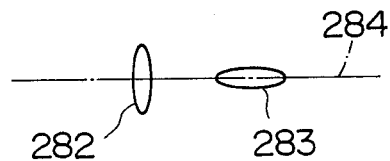
FIGS. 25 and 26 are diagrams showing states of spots, respectively.
Figure 26:
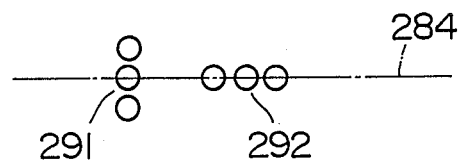

When two diffraction gratings are used in place of the cylindrical lenses 268 and 269 in FIG. 24, a group of spots 291 and a group of spots 292 shown in FIG. 26 are formed on the glass mother disk 260. Therefore, a disk having concave and convex type pits as shown in FIG. 27 can be produced. First, by setting the feeding speed of the caster 280 to the half speed, the spot group 292 can also scan the center between the adjacent track center lines 233, so that the grooves 232 are cut between the adjacent track center lines by continuously oscillating the laser 263 by a low power. When the spot groups 291 and 292 scan the track center line 233, the pit groups 293 and 294 are cut by the high power pulse oscillation of the lasers 262 and 263.

As described above, according to the invention, it is possible to perform the focus error detection which is not influenced by pits or the like on the disk and in which even if the attaching positions of the optical parts change, no offset occurs in the focus error detection signal, and any special optical system for the focus error detection is unnecessary.

We claim:

1. A focus error detection method comprising the steps of:

focusing a light beam having an astigmatism onto a medium surface and scanning said medium surface by said light beam, said surface having two kinds of pits formed thereon for providing identical modulation to said light beam in an in-focus condition of the light beam on said medium surface and for providing different modulations to said light beam in an out-of-focus condition of the light beam on said medium surface;

detecting a reflected light from said surface by at least one photo-detector;

extracting a signal modulated by at least one of said two kinds of pits from the output of said photo-detector; and obtaining a focus error detection signal from either a phase or a level of said extracted signal.

2. A method according to claim 1, wherein said two kinds of pits are pits which are respectively periodically formed in a scanning direction of said light beam and are deviated from each other in a direction perpendicular to said scanning direction, and said light beam has an astigmatism in a direction which is almost semi-perpendicular to the scanning direction.

3. A method according to claim 1, wherein said two kinds of pits are pits which are respectively long in a direction of one of two focal lines of said light beam formed by focusing said light beam onto said medium surface, signals modulated by said two kinds of pits are extracted from the output of said photo-detector, and said focus error detection signal is obtained from a difference between levels of said extracted signals.

4. A method according to claim 1, wherein there are provided a plurality of said photo-detectors at least one of which includes a multi-divided photo-detector having a plurality of photo-detecting sections, another focus error detection signal is obtained from a change in light intensity distribution of said reflected light which is detected by said multi-divided photo-detector, and the focus error detection signal is used as a control signal in a focus pull-in operation to provide the in-focus condition.

5. A focus error detection method comprising the steps of:

focusing by an optical system a light beam having an astigmatism onto a medium surface having focus error detecting pits provided thereon so that two orthogonal focal lines of the light beam are formed, said medium surface being scanned by said light beam;

detecting a reflected light from said medium surface by at least one detector;

extracting signals modulated by said focus error detecting pits from the output of said detector; and obtaining from said extracted signals a focus error detection signal which is when said medium surface is located at a circle of least confusion position at which a cross section of the light beam becomes a circle between the two focal lines of the light beam.

6. A method according to claim 5, wherein said focus error detecting pits include two kinds of pits which are periodically formed in a scanning direction of said light beam and are respectively deviated from each other in a direction perpendicular to said scanning direction, and said light beam has an astigmatism in a direction which is almost semi-perpendicular to said scanning direction.

7. A method according to claim 5, wherein said focus error detecting pits include two kinds of pits which are long in a direction of one of two focal lines of said light beam, one of said two kinds of pits is substantially long in a scanning direction of said light beam, and the other pit is substantially long in the direction perpendicular to said scanning direction.

8. A focus control apparatus comprising:

a medium on which focus error detecting pits are formed;

an optical system for focusing a light beam having an astigmatism onto said medium by an objective lens so that two orthogonal focal lines of the light beam are formed, said medium being scanned by said light beam;

at least one photo-detector for detecting a light reflected from said medium and passed through said objective lens;

detecting means for extracting signals modulated by said focus error detecting pits from the output of said photo-detector and for obtaining from said extracted signals a focus error detection signal which is set to a zero point when said medium is located at a circle of least confusion position at which a cross section of the light beam becomes a circle between the two focal lines of the light beam; and operating means for controlling a distance between said objective lens and said medium in response to said focus error detection signal.

9. An apparatus according to claim 8, wherein said focus error detecting pits include two kinds of pits which provide identical modulation to said light beam in an in-focus condition when said medium is located at the circle of least confusion position and provide different modulations to said light beam in an out-of-focus condition when the medium is deviated from the circle of least confusion position.

10. An apparatus according to claim 9, wherein said two kinds of pits are pits which are periodically formed in a scanning direction of said light beam and are deviated from each other in a direction perpendicular to said scanning direction, and said light beam has an astigmatism in a direction which is almost semi-perpendicular to said scanning direction.

11. An apparatus according to claim 9, wherein said two kinds of pits are pits which are long in a direction of one of the two focal lines of said light beam, one of said pits is substantially long in a scanning direction of said light beam, and the other pit is substantially long in a direction perpendicular to said scanning direction.

12. An apparatus according to claim 9, wherein said two kinds of pits include a group of pits in which a plurality of pits are arranged in a scanning direction of said light beam and a group of pits in which a plurality of pits are arranged in a direction perpendicular to said scanning direction.

13. An apparatus according to claim 9, wherein said detecting means comprises:

means for differentiating the output of said photo-detector and detecting a zero point thereof; thereby to extract signals modulated by said two kinds of pits; and means for detecting phases of said extracted signals.

14. An apparatus according to claim 9, wherein said detecting means comprises:
  means for differentiating the output of said photo-detector and detecting a zero point thereof, thereby to extract signals modulated by said two kinds of pits; and
  means for sampling the outputs of the photo-detector by said extracted signals to detect levels of the signals modulated by said two kinds of pits.

15. An apparatus according to claim 8, wherein there are provided a plurality of said photo-detectors at least one of which includes a multi-divided photo-detector having a plurality of photo-detecting sections, said apparatus further comprises another detecting means for obtaining another focus error detection signal from a change in light intensity distribution of the reflected light which is detected by said multi-divided photo-detector, and said operating means responds to said another focus error detecting means to use said another focus error detection signal as a control signal inn a focus pull-in operation to provide an in-focus condition of said light beam on said medium.

16. An optical information processing apparatus comprising:
  an information recording medium on which focus error detecting areas formed with at least focus error detecting pits and information recording areas in which information is recorded are alternately provided in a track direction;
  an optical system for focusing a light beam having an astigmatism by an objective lens onto said information recording medium so that two orthogonal focal lines of the light beam are formed;
  an optical head having at least one photo-detector for detecting a light reflected from said information recording medium and passed through the objective lens;
  detecting means for extracting signals modulated by said focus error detecting pits from the output of said photo-detector and for obtaining from said extracted signals a focus error detection signal which is set to a zero point when said information recording medium is located at a circle of least confusion position at which a cross-section of the light beam becomes a circle between the two focal lines of the light beam;
  operating means for controlling a distance between said objective lens and said information recording medium in response to said focus error detection signal; and
  recording means for recording information onto said information recording areas along the track direction.

17. An apparatus according to claim 16, wherein said focus error detection pits formed in said focus error detecting areas include at least one of two kinds of pits for providing identical modulation in an in-focus condition when said information recording medium is located at said circle of least confusion position and for providing different modulations in an out-of-focus condition when said information recording medium is deviated from the circle of least confusion position and are preliminarily formed so as to have an optical depth of $\frac{1}{4}$ of a wavelength of said light beam.

18. An apparatus according to claim 16, wherein grooves for optically guiding said light beam into at least said information recording areas along the track direction are preliminarily formed on said information recording medium.

19. An apparatus according to claim 16, wherein said detecting means comprises:
  means for differentiating the output of said photo-detector and detecting a zero point thereof, thereby to extract a signal modulated by said focus error detecting pits; and
  means for detecting a phase of said extracted signal to detect a phase of the signal modulated by said error detecting pits.

20. An apparatus according to claim 19, further comprising track error detecting means for sampling the output of said photo-detector by said extracted signal and for obtained a track error detection signal from a level of the signal modulated by said focus error detecting pit, and wherein this focus error detecting pit is commonly used for a track error detection.

21. An apparatus according to claim 17, wherein said detecting means comprises:
  means for differentiating the output of said photo-detector and detecting a zero point thereof, thereby to extract the signal modulated by said focus error detecting pits; and
  means for sampling the output of said photo-detector by said extracted signal to detect a level of the signal modulated by said focus error detecting pit.

22. An apparatus according to claim 16, wherein there are provided a plurality of said photo-detectors at least one of which includes a multi-divided photo-detector having a plurality of photo-detecting sections, said apparatus further comprises another detecting means for obtaining another focus error detection signal from a change in light intensity distribution of said reflected light which is detected by said multi-divided photo-detectors, and said operating means responds to said another focus error detecting means to use said another focus error detection signal as a control signal in a focus pull-in operation to provide an in-focus condition of the light beam on said information recording medium.

* * * * *